United States Patent [19]

Goldman

[11] Patent Number: 4,837,840

[45] Date of Patent: Jun. 6, 1989

[54] SYSTEM FOR VERIFYING AUTHENTICITY OF VARIOUS ARTICLES

[75] Inventor: Robert N. Goldman, Honolulu, Hi.

[73] Assignee: Light Signatures, Inc., Los Angeles, Calif.

[21] Appl. No.: 19,463

[22] Filed: Feb. 26, 1987

[51] Int. Cl.⁴ ............................................. G06K 9/00
[52] U.S. Cl. ......................................... 382/7; 356/71; 356/371
[58] Field of Search ................... 382/7, 8; 340/825.34; 235/487, 494, 457, 382; 356/371, 359, 71

[56] References Cited

U.S. PATENT DOCUMENTS

| | | | |
|---|---|---|---|
| 3,238,501 | 3/1966 | Max et al. | 235/494 |
| 4,200,394 | 4/1980 | Bartlett, Jr. et al. | 356/359 |
| 4,218,674 | 8/1980 | Brosow et al. | 340/825.34 |
| 4,257,264 | 3/1981 | Rottenkolber | 356/359 |
| 4,367,951 | 1/1983 | Hammon | 356/359 |
| 4,423,415 | 12/1983 | Goldman | 340/825.34 |
| 4,433,437 | 2/1984 | Fantone | 235/457 |
| 4,450,348 | 5/1984 | Stockburger et al. | 235/487 |
| 4,454,610 | 6/1984 | Sziklai | 340/825.34 |
| 4,464,786 | 8/1984 | Nishito et al. | 382/7 |
| 4,541,113 | 9/1985 | Seufert et al. | 382/4 |
| 4,544,836 | 10/1985 | Galvin et al. | 235/487 |
| 4,647,196 | 3/1987 | Kuni et al. | 356/359 |
| 4,661,983 | 4/1987 | Knop | 340/825.34 |

Primary Examiner—Leo H. Boudreau
Attorney, Agent, or Firm—Nilsson, Robbins, Dalgarn, Berliner, Carson & Wurst

[57] ABSTRACT

Representations are developed that characterize an article for identification by comparison with a reference standard as an escort memory. The representations are reduced to a binary tri-level code covering two extreme possibilities and an intermediate range for indecisive cases. Characteristics are sensed by light in one form by interferometer techniques.

4 Claims, 2 Drawing Sheets

SYSTEM FOR VERIFYING AUTHENTICITY OF VARIOUS ARTICLES

BACKGROUND AND SUMMARY OF THE INVENTION

In recent years, a wide range of articles including documents, artistic works, various commercial products and banknotes have been targets for intense counterfeiting efforts. In a widespread attempt to deter the production of illicit copies, various techniques have been developed for identifying or authenticating genuine articles. For example, U.S. Pat. No. 4,423,415 entitled "Non-Counterfeitable Document System" (Dec. 27, 1983) discloses systems and techniques for effectively authenticating specific genuine articles.

Although prior art systems and techniques have considerably deterred counterfeit operations, problems continue to exist, particularly with regard to certain articles. For example, paper currency continues to be the objective of considerable counterfeiting activity. Aspects of currency production and the manner in which money circulates tend to raise special problems. For example, banknotes are subjected to considerable abuse resulting from extensive handling. In routine commerce, banknotes are folded, crumpled, soiled and abraded.

A number of techniques have been proposed to authenticate banknotes by recognizing the generic characteristics of specific monetary issues. For example, characteristics of paper, printed material and paper additives have been tested to distinguish valid and invalid currency. Although such systems have met with substantial success, problems continue to exist. For example, if a test criteria is generic, i.e. applicable to all banknotes of a specific issue, counterfeiters are afforded a substantial degree of tolerance in their efforts to duplicate. That is, authentication techniques which use the same criteria to verify thousands of banknotes must be far less discriminating than a technique applying specific criteria to identify a specific banknote. However, known techniques for individual authentication of banknotes raise other practical problems.

As mentioned above, banknotes change as a result of wear, wrinkling and soiling. Consequently, the typical substantial alteration of banknotes imposes a special problem for individual authentication. As another problem, the available space on a bill for subtle code marks may be somewhat limited. Additionally, production economy is usually important and authentication should involve simple and economical apparatus. Accordingly, a need exists for an improved system to test and authenticate currency.

Various other articles also have presented special problems for reliable authentication. For example, some effective prior authentication systems involve the passage of light through an article being tested. Of course, such a technique cannot be used on opaque articles. Additionally, some of these objects may be relatively small. Accordingly, the need exists for an improved economical and effective authentication system for various opaque and small objects such as machine parts, integrated circuit chips and pasted-on labels.

In general, the system of the present invention is directed toward the authentication of various articles including currency, opaque objects and small items. The system characterizes articles with an efficient and effective code that accommodates various problem articles. Specifically, the system allows for considerable deterioration in currency and may also be used in cooperation with sensing techniques for opaque and small articles. Furthermore, the developed characterizing identification may be recorded in a format that requires relatively limited space. Additionally, the format facilitates easy comparison and simple sensing, e.g. it may be embodied in a self clocking configuration.

In accordance with the system of the present invention, the observed characteristic of an article is dissected into data elements or pixels which are quantized into one of three possible values. For example, in a currency system, the translucency of a banknote may be sensed at several discrete areas after which the resulting signals are quantized to manifest each area as: (1) definitely darker than the average reading, (2) definitely lighter than the average reading or (3) close to the average reading. As will be apparent from the detailed descriptions below, such characterization accommodates effective verification in spite of currency deterioration and is effective for characterizing certain phenomena as may be taken from opaque objects.

With regard to opaque objects, in accordance herewith, interfering light is utilized to develop characterizing patterns. For example, two beams of light are reflected from a specific area location on the object under investigation. The wavefronts of the beams are directed so as to interfere with each other and as a consequence an interference pattern is generated in the manner of an interferogram. Such patterns manifest peculiarities of a specular surface, e.g. one which is somewhat irregular. Such patterns tend to be binary, that is, interference either is present or it is not present, thus producing either darkness or light. In accordance with the present invention, such patterns can be effectively sensed and compared to identify or authenticate an article.

As disclosed in detail below, the system hereof may be variously implemented for operation with various forms of articles, various identification characteristics and various techniques. For example, interferometer techniques may be utilized on products which have no particularly specular surface as by applying an irregular surface. Also, various representation formats may be employed and, of course, a wide variety of techniques may be employed for providing reference identification data.

BRIEF DESCRIPTION OF THE DRAWINGS

In the drawings, which constitute a part of this specification, exemplary embodiments of the invention are set forth as follows.

DESCRIPTION OF THE ILLUSTRATIVE EMBODIMENTS

As indicated above, detailed illustrative embodiments of the present invention are disclosed herein. However, authentication mediums, data formats and operating systems constructed in accordance with the present invention may be embodied in a wide variety of different forms, some of which may be quite different from those of the disclosed embodiments. Consequently, the specific structural and functional details disclosed herein are merely representative; yet in that regard they are deemed to afford the best embodiments for purposes of disclosure and to provide a basis for the claims herein which define the scope of the present invention.

Figure 1:
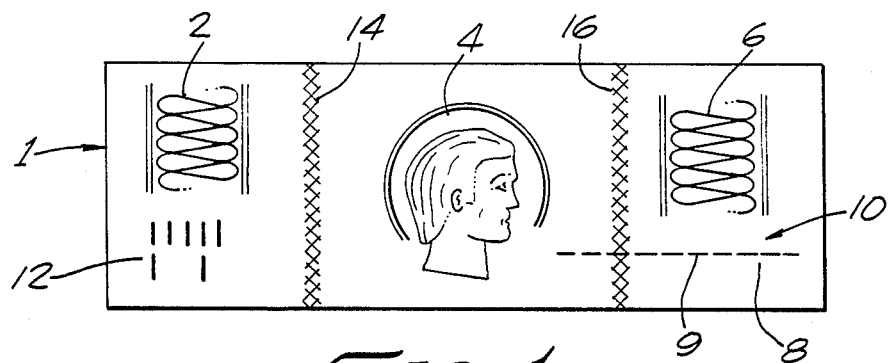
FIG. 1 is a plan view of a banknote produced in accordance with the present invention.

Referring initially to FIG. 1, a banknote 1 is illustrated incorporating structural aspects of the present invention to enable effective and reliable authentication of the note. As illustrated, the banknote 1 is printed with various indicia 2, 4 and 6 in the form of traditional art and identification. Additionally, a linear row 8 of dense registration marks 9 is engraved on the bill to identify an upper adjacent area 10 which generally characterizes the note.

Essentially, the area 10 is dissected into unmarked pixels (explained below) each being defined by a predetermined number of marks 9 in the row 8. Accordingly, the translucency or other characteristic of the note 1 is sensed at specific pixels in the area 10 and recorded on the banknote 1 as an escort memory. The memory or record is in the form of a binary tri-level code, a format of which is illustrated by the dashed lines 12. Consequently, the note 1 can be authenticated by: sensing the area 10 for the predetermined characteristic at the predetermined pixels, developing the resulting data in accordance with a line format and correlating the results with representations of the lines 12. Positive correlation indicates an authentic or genuine bill.

Generally, techniques and apparatus for authenticating articles by correlating a physical characteristic to a record of that characteristic tend to have some limitations. For example, currency is modified substantially with use, not only by normal wear and dirt, but also by other more extreme changes. Specifically, as illustrated in FIG. 1, the note 1 may be substantially worn as for example along fold lines 14 and 16. In that regard, it is to be noted that the fold line 16 crosses the elongate characteristic area 10 and therefore is likely to substantially alter the original translucency of the note in the crossing area. The line may have a sharp narrow edge line where it is worn thin and is very translucent. Alternatively, areas of the fold line 16 might either be excessively soiled. For a soiled area, the density would be likely to increase whereas for a thin worn area, the density would likely be lower. Consequently, in scanning the area 10 to produce a signal representative of translucency, the fold line 16 will probably produce a sharp change in the resulting signal. Of course, other effects of deterioration in the note 1 may also produce significant changes in the translucency characteristic at the area 10.

Generally, the system of the present invention affords a technique to discount changes as considered above and to attain a reasonable degree of accuracy in authenticating articles as banknotes which are subjected to considerable wear, wrinkling and soiling. The detailed structure, techniques and apparatus involved in that regard are treated below; however, preliminarily consider another form of article generally considered difficult to authenticate.

Figure 2:
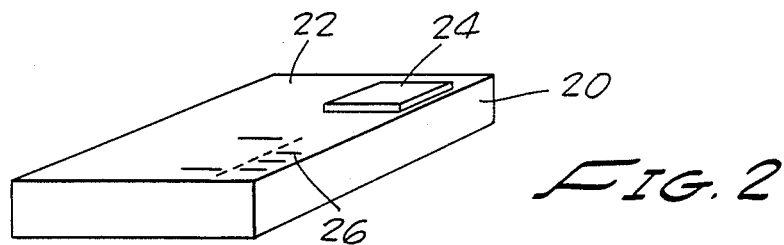
FIG. 2 is a perspective view of an article produced in accordance with the present invention.

Referring to FIG. 2, a block 20 is illustrated which is representative of any of a variety of opaque objects. Specifically, the block 20 might comprise a machine part, an integrated circuit chip or even an applied opaque label. Not only is the object opaque but additionally it may be relatively small. Consequently, the opacity of the block 20 along with its small size may present a substantial difficulty in utilizing past authentication techniques, specifically techniques involving the passage of light through the object to be authenticated.

The block 20 has a surface 22, a portion of which is protected by a transparent shield 24. Reference marks 26 (similar to the marks 12, FIG. 1) are stamped or otherwise fixed on the surface 22. The block 20 is verified by utilizing a characteristic of the surface 22 under the shield 24 which is identified by the marks 26. Specifically, under the shield 24, the surface 22 has a light reflective characteristic, i.e. a specular surface which has sufficient irregularities to accomplish an interferogram. A fragment of the interferogram is characterized by the marks 26.

Effective identification surfaces might appear to be relatively smooth, however, the surface of a tomato for example is highly specular and provides an interferogram of substantial character. If the surface of an article is not specular, i.e. does not produce an interferogram of sufficient character, a specular surface can be provided as with paint which has been quick-dried by a current of warm air to provide a wrinkle paint. The specular nature of such surfaces with respect to the provision of interferograms is well known and patterns are illustrated and described in a book entitled "Microstructures of Surfaces" at page 62.

Essentially, in accordance herewith, the area of the surface 22 under the transparent shield 24 is illuminated as by two beams of light so that the wavefronts of the beams interfere with each other and an interference pattern is caused by collision of the wavefronts. Such an interference pattern or interferogram image is substantially unique to the reflecting surface. The pattern is registered by the lines 26. As a result, correlation in accordance herewith will verify that the surface under the shield 24 is the same surface previously sensed and represented by the escort memory in the form of the lines 26.

To preserve the original surface, the shield 24 is provided. That is, the characteristic surface of the block 20 is protected by the shield 24 from change that might otherwise result from use and age. The shield 24 might take the form of various non-reflective films or coatings. In the case of a microelectronic chip, the shield 24 may be an integral fragment of a plastic encapsulation.

It is contemplated that the block 20 may be relatively small. Consequently, the lines 26 must be relatively compact. In that regard, the lines 26 permit simple representation and precise identification while using a minimal space. Specifically, the binary tri-level code is used, in a format similar to that of FIG. 1 as described in detail below. The interference light pattern emanating from the surface 22 under the shield 24 tends to be binary, that is interference either is present or it is not present producing either darkness or light. Accordingly, the random irregularities in the reflecting surface of the block 20 tend to produce a random interference pattern of bands or stripes. Of course, light interference patterns are very well known to exhibit patterns characteristic of the reflecting surface. Interference patterns, for example, are illustrated in Van Nostrands Scientific Encyclopedia, 6th Edition, Copyright 1983, at page 1640.

Figure 3:
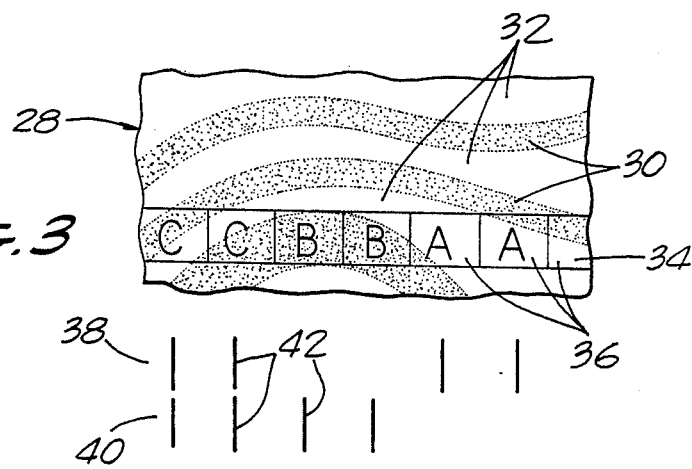
FIG. 3 is a graphic representation illustrative of the code format of the present invention.

A fragment of the interference pattern reflected from the surface 22 is illustrated in FIG. 3. Specifically, the fragment 28 includes dark bands 30 and light bands 32. Generally, in accordance with the present invention, an effective technique and apparatus are provided for developing test values of the developed characteristic illustrated by the pattern fragment 28. The process for developing identification data for the pattern involves pixel dissection and is illustrated in FIG. 3 and will now be considered in detail. Specifically in that regard, it is to be noted that the system copes with the problem pixels which are borderline in the binary pattern.

Referring back to FIG. 3, a data belt or stripe 34 is illustrated in FIG. 3 extending linearly across the bottom of the fragment 28. The stripe 34 and the letter designations A, B and C shown in the stripe do not physically exist, but rather are shown to illustrate the formation of data pixels characteristic of the fragment 28 as dissected by the stripe 34.

As illustrated, the stripe 34 is segmented to define distinct areas 36 generally constituting pixels. Of course, the areas 36 are somewhat idealized in representation; however, they illustrate certain concepts and technology as explained below.

The pixel areas 36 are labeled by letter designations A, B or C. Pixel areas 36 labeled A are located predominantly in a light band 32. Pixel areas 36 labeled B are located predominantly in a dark band 30, and pixel areas 36 labeled C are substantially split or divided between dark bands 30 and light bands 32. Thus, overall the pixel areas 36 labeled A are definitely lighter than an average reading. The pixel areas 36 labeled B overall are definitely darker than an average reading, and the pixel areas 36 labeled C are generally divided to provide a somewhat average light level. These distinctions are employed in the system of the present invention to accomplish the binary tri-level code which is illustrated beneath the fragment 28 in FIG. 3 and will now be explained.

At the bottom of FIG. 3, lines or bars 42 are shown in two parallel rows 38 and 40. It will be apparent that the configuration affords four possibilities, i.e. (1) a bar in neither row, (2) a bar in the upper row, (3) a bar in the lower row and (4) a bar in both rows. One of the possibilities is not used. That is, in order to provide a self-clocking system, the possible configuration of "no bar" is eliminated from the code.

A single bar 42 in the upper row 38 indicates a pixel area 36 (labeled A) which is substantially light. A single bar 42 in the lower row 40 designates a situation (B) where the pixel area 36 is substantially dark. A pair of aligned bars 42 (one in each of the rows 38 and 40) manifest a substantially divided pixel area 36, i.e. labeled C, and neither distinctly light nor dark but someplace in between. Pixels, states and representative signals are accordingly designated A, B and C herein.

Thus, a binary tri-level code is accomplished as illustrated by the lines 12 in FIG. 1 and the lines 26 FIG. 2. Again, the code is based on a binary tri-level designation to represent either of two extremes and a mid-range that is indecisive. The designation or code is effectively represented by two binary, i.e. one for each of the rows 38 and 40.

As indicated above, the code or designation system disclosed is effective for the representative coding of binary patterns as well as articles (banknotes) which are likely to be deteriorated. For binary patterns, it is effective for the representation of borderline binary data which may be problematic in view of the need for very fine resolution. Recapitulating to some extent, in the utilization of the binary tri-level marking system, an aligned pair of bars in rows 38 and 40 (state C, indecisive) is not used in the format to identify the article. That is, only the more extreme or decisive characteristics as manifest by single bars 42 in one row (for pixel states A and B) are used to identify or authenticate an article.

In correlating data, the pixels C are disregarded as representing a condition that is indecisive. For example, a pixel C is marginal, either as a result of the sensing or the source pattern itself. Accordingly, such pixels are eliminated from the correlation. Normally, implementations in accordance herewith will involve a rather significant amount of data for the observed phenomena which is disqualified. Disqualification occurs if a pixel is determined to be indecisive either in the original sensing of the article or in subsequent sensing pursuant to authentication.

Turning now to the system for accomplishing the operations described above, consider FIG. 4. An article 50 (upper right) may take various forms specifically including a banknote 1, as illustrated in FIG. 1 or a block 20, as illustrated in FIG. 2. Essentially, the article 50 is to be authenticated as genuine, having been coded for identification as described with reference to FIGS. 1 and 2.

The article 50 (FIG. 4) is received in a handling mechanism 52 in which it is positioned to be sensed. Normally the sensing operation will involve some relative motion and in that regard may take structural forms as described in U.S. Pat. No. 4,423,415. If the article 50 is paper or other sheet medium, the mechanism 52 will normally constitute a paper processor for moving the article in relation to sensors. Alternatively, if the article 50 comprises a solid object, various other mechanisms, as wands well known in the art may be employed to obtain the desired positional and motion relationship with respect to sensors.

Figure 4:
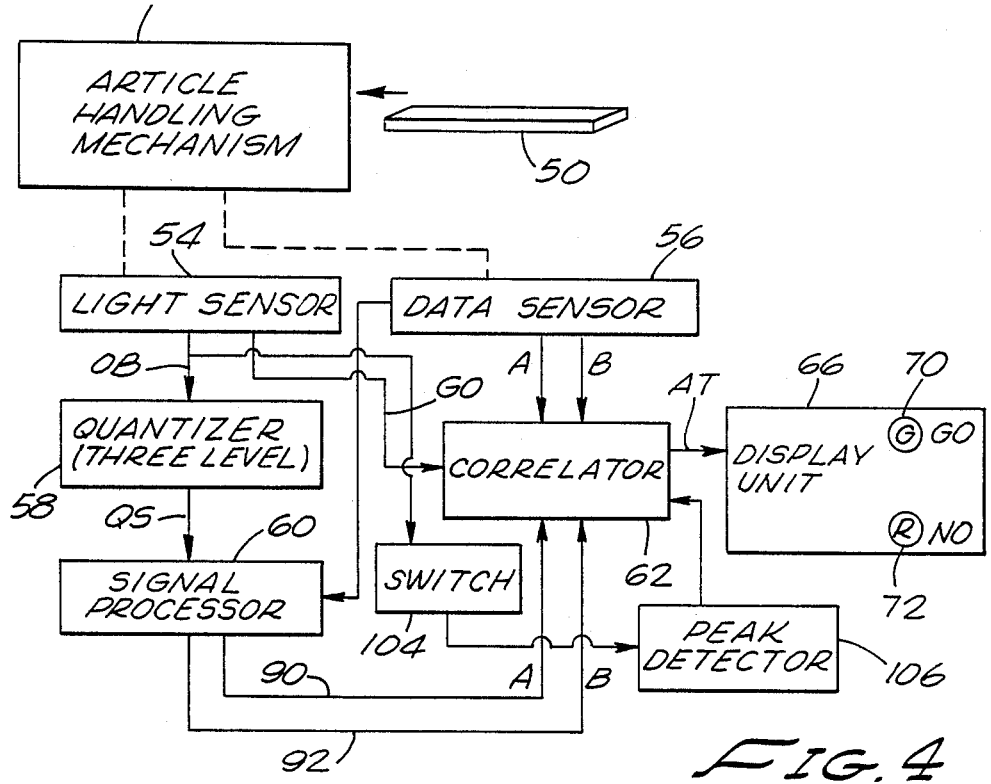
FIG. 4 is a block diagram of a system constructed in accordance with the present invention.

As shown in FIG. 4, the mechanism 52 is associatively coupled with a light sensor 54 and a data sensor 56. These elements normally will be integral with the mechanism 52, however, separate representation is helpful for purposes of explanation.

The light sensor 54 senses the identifying characteristic of the article 50 in the form of an analog or scaled signal OB. Specifically, for example, if the article 50 is in the form of the bill 1 (FIG. 1), the light sensor 54 may measure the translucency of the pixels in the area 10. Of course, other characteristic observations may be used as may other light forms. If the article 50 is in the form of the block 20 (FIG. 2), the light sensor 54 comprises an interferometric apparatus (providing a light pattern as illustrated in FIG. 3) along with a scanner for individually sensing the pixel areas 36 to provide the signal OB.

The data sensor 56 (FIG. 4) simply comprises an optical reader for sensing the reference data represented by the marks 12 (FIG. 1) or the marks 26 (FIG. 2), both in the format as explained with reference to FIG. 3. Two separate cells (not shown) sense the rows 38 and 40 (FIG. 3). Accordingly, a signal indicating detection of a line by one of the cells indicates the status A or B, while a signal manifesting a line for both of the rows 38 and 40 indicates a status C. Thus, the sensor 56 may take a very simple form with two binary outputs A and B; the status or output C being manifest by the simultaneous occurrence of both signals or outputs A and B.

The light sensor 54 (FIG. 4) supplies an "actuate" signal GO to a correlator 62. The observed signal OB from the light sensor 54 is provided to a quantizer 58. The quantizer 58 resolves the observed signal OB into a quantized signal QS having three distinct levels representative of the three distinct signal ranges A, B and C. Specifically, as explained with reference to FIG. 3, the observed signal OB is quantized in accordance with signal representations A, B, or C.

The three-level quantized signal QS is supplied to a signal processor 60 for developing representations equating to binary tri-level code as explained in detail above. Specifically, the signal processor 60 comprising a three-state gate arrangement provides outputs A' and/or B' for indicating the code as explained. The conductors 90 and 92 carrying the observed signals A' and B' are connected to the correlator 62.

Functionally, the correlator 62 performs the requisite logic to evaluate the degree of similarity in a comparison between the reference signals A and B, and the observed signals A' and B'. As explained above, in accordance with the present invention, the coincidental presence either of both signals A and B or the signals A' and B' designates a pixel that is ignored in the correlation. Such an indication manifests the fact that the observed pixel (either at the time of coding the article or presently) is not sufficiently distinct to serve as a characteristic for identification.

Pixels that are sufficiently distinct to serve for identification are manifest by the presence of a signal A or B, but not both in the same data set. Logically, the function of the correlator on a pixel-by-pixel analysis may be stated as follows:

(A and not B) and (A' and not B') = pixel coincidence (B and not A) and (B' and not A') = pixel coincidence The logic expressions above reflect the fact that the presence of either of the signals A and B or A' and B' simultaneously indicates a discarded pixel test. Further, the expressions indicate a favorable comparison or coincidence with the presence of the signals A and A' and the absence or negation of the signals B and B'. Conversely, the presence of the signals B and B' and the negations of the signals A and A' similarly indicates a coincidence. Note that the signal logic resolves the manifest state C simply and inherently.

Structurally, the basic tests of the correlator 62 may simple comprise "AND" function gates for performing the logic. The determination from individual correlations is then resolved by the correlator structure, a variety of forms of which are very well known in the prior art. A modification in that regard is explained below for certain situations.

Essentially, the correlator 62 tallies the instances of pixel correlation with regard to a threshold for selectively providing an actuating signal AT to a display unit 66. In one embodiment, the actuating signal AT is binary to indicate either the rejection or approval of the article 50. Thus, depending on the criteria preestablished within the correlator 62, the display unit 66 illuminates one of two signal lamps, a green lamp 70 or red lamp 72. Of course, the green lamp 70 manifests a favorable authentication and the red lamp 72 manifests a unfavorable test. An additional signal (presumably manifest by a yellow lamp) may be provided in accordance with well known correlation techniques to indicate that the correlation was not sufficiently decisive to indicate either approval or disapproval.

As indicated above, the system of FIG. 4 may incorporate further structure (as illustrated) specifically for treating sharp peaks in the signal OB, when banknotes or similar media are being processed. The signal OB is coupled through a switch 104 to a peak detector 106. The output from the peak detector 106 is applied to the correlator 62 during select modes of operation for refining a validity determination. The philosophy and details of such operation are considered below with respect to authenticating a banknote 1 as illustrated in FIG. 1.

Assume a banknote 1 as described above was processed so that the translucency of certain pixel areas within the area 10 are recorded by the marks 12 utilizing the system as described above. Of course, various techniques for sensing the translucency may be employed, also a multitude of different printing or engraving processes might be utilized to accomplish the marks 12.

Suitable sensing apparatus and structure to develop and process the data are described in U.S. Pat. No. 4,423,415 issued December 1983 to Robert N. Goldman. However, consider the banknote 1 in somewhat greater detail. With reference to the diagrammatic representation of FIG. 5. A fragment of the row 8 of marks 9 on the banknote 1 (FIG. 1) is shown greatly enlarged in FIG. 5. Also, individual pixel areas 70, 72 and 74 are designated above the line 8. Somewhat graphically, the optical density of the pixel areas 70, 72 and 74 is indicated by shading lines 76. As represented, the pixel area 70 is quite dense, the pixel area 72 is less dense (center portion relatively translucent) and the pixel area 74 is still less dense, i.e. relatively translucent. Thus, in accordance with the designation format indicated above (FIG. 3) the pixel area 70 would be labeled B (dark), the pixel area 72 would be labeled C (mid-range) and the pixel area 74 would be labeled A (light).

A curve 107, representative of the signal OB (FIG. 4) and the translucency of the pixel areas 70, 72 and 74 is shown below the row 8. The bar code 12 for the pixels is shown under the curve 107. Specifically, a bar 80 (below the reference line) manifests the dense pixel 70 and a pair of bars 82 (above and below the reference line) manifests the indeterminate pixel 72. Normally, a bar 84 (above the reference line) would manifest the light or translucent pixel 74; however, that is changed by a spike in the signal.

Figure 5:
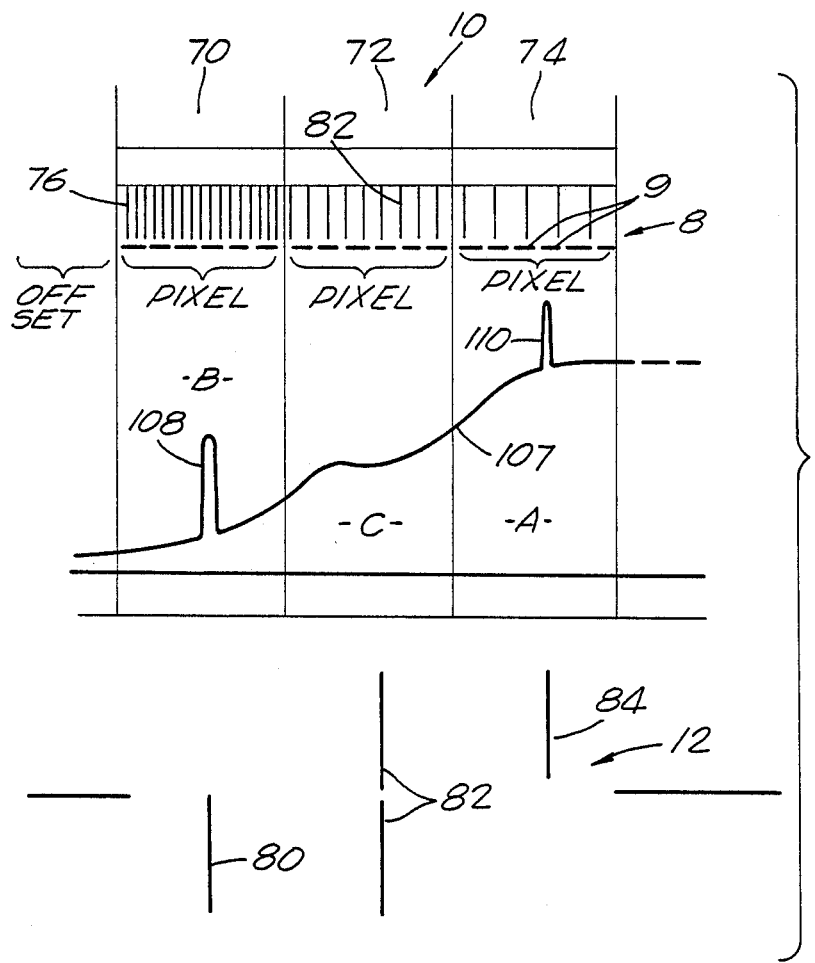
FIG. 5 is a graphic and pictorial representation illustrative of the operation of the present invention.

The curve 107 of FIG. 5 illustrates a pair of distinct anomalies in the banknote 1. Specifically, a pair of sharp translucent areas as might occur on either side of a dirty fold line are indicated by spikes 108 and 110. Essentially, the spikes 108 and 110 indicate subpixel areas where the note may have been worn thin or otherwise deteriorated. While the spikes 108 and 110 are positive-going, negative-going spikes are alternative possibilities as to indicate a dirty subpixel area. Thus, spikes might extend in either direction and in different situations are differently treated. If a sharp change in a pixel is one that agrees with the determined characteristic of the pixel, that pixel is not used in determining the validity of the note. This means that the determined characteristic includes the spike information and so may be erroneous. Alternatively, if a sharp change within a pixel is one that opposes the determined characteristic for that pixel, the pixel is used in determining validity of the note. The reason is that the absence of the spike would result in the same characteristic being determined. For example, if there is a sharp change to higher density in a pixel of characteristic A, that pixel is eliminated in the validity determination, whereas if there is a sharp change to lower density, the pixel is used in validity determination. Thus, as illustrated in FIG. 5, the pixel area 70 is used (spike 108 not withstanding) while pixel area 74 is rejected.

Recapitulating to some extent, it is to be understood that various techniques may be utilized to isolate and treat sharp changes in the characteristic of an article under investigation. As illustrated in FIG. 5, spikes may occur in the analog to indicate particular anomalies. Consequently, the scale signal or observed analog may be sensed as two distinct representations, i.e. one signal manifesting the area under the curve 78 for each pixel and a second signal indicating spikes or a degree of change occurring within the pixel. The two separate signals combine to determine the final resolution of validity as indicated by the display unit 66 (FIG. 4).

To accomplish a complete understanding of the present invention, assume now a desire to authenticate a banknote 1 in the form of the article 50 using the system as represented in FIG. 4. Accordingly, the article 50 is provided to the article-handling mechanism 52 to be positioned in relation to the sensors 54 and 56 for respectively sensing the translucency of select pixels in the area 10 and sensing the data manifest by the marks 12. As indicated above, the light sensor 54 may take the form of a charge coupled device providing two specific signals, i.e. the area under a translucency analog curve and the degree of change in that curve. Alternatively, as illustrated in FIG. 4, the light sensor 56 provides a scaled signal OB which is separately processed by the quantizer 58, the processor 60 and the peak detector 106. Accordingly, a signal OB as represented by the curve 107 (FIG. 5) is supplied from the sensor 56. After quantizing, the signal QS is processed and gated by the processor 60 to provide the binary outputs in lines 90 and 94.

Signals representative of individual pixel translucency are classified on the basis of three distinct range levels by the quantizer 58. That is, each signal is manifest to indicate either: a high level of translucency A, a low level of translucency B or an intermediate level of translucency C. As indicated above, the intermediate levels of translucency C are disregarded in the correlation.

The multiple level signals from the quantizer 58 are supplied to a signal processor 60 to accomplish the combined binary format as described above and represented by the marks 12 (FIG. 1). Essentially, the presence of a signal A' is manifest in the line 90 while the presence of a signal B' is manifest in the line 92 and the presence of a signal C' is manifest by a signal in both the lines 90 and 92. Such data is applied to the correlator 62 along with similar format data from the sensor 56 as sensed directly from the marks 12 (FIG. 1). As indicated above, the correlator 62 performs a bit-by-bit correlation between the reference signals from the sensor 56 and the freshly developed signal. The correlation may be simply on the basis of the code signals from the processor 60 or may also involve the peak signals from the detector 106.

With the switch 104 closed, the peaks 108 and 110 in the signal OB are sensed by the peak detector 106 to provide representative pulses to the correlator 62. Essentially, the latter signal is employed to cancel or disregard comparisons for certain select pixels as explained above.

Of course, various forms of correlators are well known and widely used to determine the degree of similarity between sequences of referenced signals. Various of such units may be used as the correlator 62 to selectively illuminate one of the lamps 70 or 72 to manifest the test of the article 50 in the form of a banknote 1.

As indicated above, the correlation of the binary tri-level signals manifest as A, B, A' and B' is a simple logic operation. With the switch 104 closed, the operation is slightly more complex, involving the peak signals. Essentially, in accordance with well known correlation techniques and apparatus, the correlator may incorporate logic to relate the presence of signals manifesting a significant degree of change in a pixel to selectively disregard the pixel depending upon the polarity relationship as indicated above. If the degree of change signal accords with the level of the pixel measurement, the data is disregarded. If it does not accord, it is used. Designating positive spikes as PP and negative spikes as NP, the logic is modified simply by ignoring any pixel correlation that involves: A or A' and PP or involves B or B' and NP.

Of course, other various forms of components may well be employed in a system in accordance herewith and as illustrated by the embodiment of FIG. 4. Spike and extreme signal changes in pixels will occur in various objects of authentication and specific treatments will be suggested. Accordingly, the scope hereof is deemed appropriately determined by the claims as set forth below.

What is claimed is:

1. A system for developing test values of a substantially binary characteristic of an article that is to be authenticated on the basis of such values representing said characteristic, said system comprising:

means to provide scale signals representative of said substantially binary characteristic at a specific location of said article;

means for converting said scale signals to one of three representative values of quantized signals, each being indicative of one of three distinct signal ranges encompassing a range approximating substantially average values and one range above and one range below said substantially average values;

means for providing said quantized signals in a binary format; and means for rejecting quantized signals for a location of said article representing said range approximating substantially average values.

2. A system according to claim 1 wherein said means to provide scale signals includes an interferometer means for providing a light interference pattern modulated by said article and means for providing said scale signals representative of at least a portion of said interference pattern.

3. A system according to claim 1 wherein said means for providing said quantized signals comprises means for providing binary tri-level coded signals in a two-bit binary code format.

4. A system according to claim 1 wherein means to provide scale signals comprises an interferometer means for providing a light interference pattern from said surface.

* * * * *